US007003724B2

(12) United States Patent
Newman (10) Patent No.: US 7,003,724 B2
(45) Date of Patent: Feb. 21, 2006

(54) METHOD AND SYSTEM FOR DISPLAY OF ELECTRONIC MAIL

(75) Inventor: Paula S. Newman, Los Altos, CA (US)

(73) Assignee: Xerox Corporation, Stamford, CT (US)

(*) Notice: Subject to any disclaimer, the term of this patent is extended or adjusted under 35 U.S.C. 154(b) by 837 days.

(21) Appl. No.: 09/732,029

(22) Filed: Dec. 8, 2000

(65) Prior Publication Data

US 2002/0073117 A1 Jun. 13, 2002

(51) Int. Cl.
*G06F 15/00* (2006.01)
(52) U.S. Cl. .................. 715/526; 715/530; 709/206
(58) Field of Classification Search ................ 715/526, 715/530; 709/206
See application file for complete search history.

(56) References Cited

U.S. PATENT DOCUMENTS

| 5,749,079 A | * | 5/1998 | Yong et al. .................. 707/100 |
| 6,346,952 B1 | * | 2/2002 | Shtivelman .................. 715/758 |
| 6,525,747 B1 | * | 2/2003 | Bezos .......................... 715/751 |
| 6,628,194 B1 | * | 9/2003 | Hellebust et al. ............. 340/7.5 |
| 6,631,398 B1 | * | 10/2003 | Klein .......................... 709/206 |

OTHER PUBLICATIONS

U.S. Appl. No. 09/717,278, filed Nov. 11, 2000, Baldonado et al.
U.S. Appl. No. 09/732,023, filed Dec. 8, 2000, Newman
U.S. Appl. No. 09/732,024, filed Dec. 8, 2000, Newman et al.
U.S. Appl. No. 09/732,028, filed Dec. 8, 2000, Newman.
(Author Unknown) AmikaNow! Corporation, "AmikaFreedom™ User Guide," pp. 1-26, (Sep. 15, 2000).

(Author Unknown) AmikaFreedom.com™, "Summarizing Email Notification Service (Beta)," [Retrieved from the Internet at http://www.amikafreedom.com/afc1/default.jsp on May 12, 2002].
(Author Unknown) AmikaFreedom.com™, "Why Use AmikaFreedom.com?," [Retrieved from the Internet at http://www.amikafreedom.come/afc1/amikafreedom.com/WhatIs.htm on May 17, 2002].
(Author Unknown) AmikaHighlighter™ SDK, "Enterprise Solutions for Email Overload," pp. 1-2, [Retrieved from the Internet at http://www.amikanow.com/products/amikahighlighter.htm on May 17, 2002].
(Author Unknown) AmikaClassifier™, "Enterprise Solutions for Email Overload," pp. 1-2, [Retrieved from the Internet at http://www.amikanow.com/products/classifier.htm on May 17, 2002].

(Continued)

*Primary Examiner*—Stephen Hong
*Assistant Examiner*—Kristina Honeycutt
(74) *Attorney, Agent, or Firm*—Nixon Peabody LLP (57) ABSTRACT

The invention provides a sequence of increasingly detailed presentation levels to assist a user in deciding whether a thread is of interest. If so, the text of the threaded messages is presented at a level of detail corresponding to the user's level of indicated interest. In particular, the invention provides a method comprising creating a message collection viewing cascade including a plurality of viewing levels for presenting one or more message threads and abbreviated forms of one or more messages, abbreviating at least one of the messages using one of a plurality of abbreviation techniques, and formatting each abbreviated message to be displayed at one of the plurality of viewing levels in the message collection viewing cascade. Each abbreviation technique specifies a manner in which the messages can be abbreviated, and each viewing level in the collection viewing cascade offers a different degree of detail for presenting the abbreviated forms of the messages.

30 Claims, 9 Drawing Sheets

OTHER PUBLICATIONS (Author Unknown) AmikaQuery™, "Enterprise Solutions for Email Overload," pp. 1-3, [Retrieved from the Internet at http://www.amikanow.com/products/query.htm on May 17, 2002].

(Author Unknown) Amika™ Enterprise Edition, "Enterprise Solutions for Email Overload," pp. 1-2, [Retrieved from the Internet at http://www.amikanow.com/products/aee.htm on May 17, 2002].

(Author Unknown) AmikaFreedom™ for Outlook 98/2000, "Enterprise Solutions for Email Overload," pp. 1-2 [Retrieved from the Internet at http://www.amikanow.com/products/amikafreedom.htm on May 17, 2002].

(Author Unknown) AmikaFreedom Features & Benefits, AmikaFreedom™ for Outlook 98/2000, "Enterprise Solutions for Email Overload," pp. 1-2, [Retrieved from the Internet at http://www.amikanow.com/products/AF_features.htm on May 17, 2002].

(Author Unknown) AmikaFreedom™ Available for OEM to ISP or ASP, "Enterprise Solutions for Email Overload," pp. 1-2, [Retrieved from the Internet at http://www.amikanow.com/products/service.htm on May 17, 2002].

\* cited by examiner

FIG. 1

| | | |
|---|---|---|
| Why is tcl broken? | (53) | 06/10/99 – 06/22/99 |
| (Mira) Hello. I'm trying to collect a list of all the _current_issues making tcl a bad language choice. I'd like concrete examples, and not just vague assertions that ... | | |
| MAC-address | (1) | 06/10/99 |
| (Jannsen) High, is there a way to get the MAC-addresses and other properties of network cards with python? thanx. Holger ... | | |
| Asserting object class | (4) | 06/10/99 |
| (Adi) In a method, I'd like to asset that a parameter is an object which is of a specific class or has this class as it's base class. I can test on the _class_ and its ... | | |
| KBHIT in a Windows Environment | (2) | 06/10/99 |
| (Zimmerle) I am using Python 1.52 in a Windows 98 environment. I recently tried using the kbhit() function in the msvcrt module. It appears to work fine in the Python ... | | |
| Pythonwin – advise sought | (2) | 06/10/99 |
| (Williams) I am looking at Pythonwin as an alternative to Tk and would appreciate advice on the following three questions. The Pythonwin documentation points to MFC ... | | |
| force sequenz with only one item? | (4) | 06/10/99 – 06/14/99 |
| (Jannsen) High, I thin it's easy to solve, but I couldn't get it right now. Take a look at the command-line source below: >>> A = 0 >>> B = 1 >>> seq=raw_input("?") ?A,B>>> ... | | |
| Date formats | (4) | 06/10/99 – 06/11/99 |
| (Milliger) I read the documentation in the Python Reference Library (6.3) on time access and conversions and chapter 8 in programming python, yet I can't figure out if ... | | |
| Advice on an how to handle errors in extension module. | (1) | 06/10/99 |
| (Oliphant) I'm writing some Python-C interfaces to some mathematical libraries in FORTRAN. In particular, I'm working on interfacing QUADPACK with Python. The code is ... | | |

723. Mark Hammond                            06/18/99 17:15

> [Schulenburg: I have been using a freeware product called Autoduck to document my Python source code.]

Cool! I use AutoDuck to document all my Python extension C++ code. All the helpfiles in the Win32 extensions are generated using autodock.

Sorry in advance for the length of this, but I am in exactly the same predicament as you, and have been thinking for a number of years how to resolve this. I'm really pleased to finally find someone else with this problem, and really hope we can solve it in a reasonable way. ...

However, depending on how far you have gone with AutoDuck, pythondoc/gendoc isn't solving the exact same problem.

IMO, AutoDuck generates far superior reference documentation.

A new release of pythondoc uses XML, I believe, so PythonDuck could be a tool that can enhance the documentation generated by pythondoc.

But in summary, Pythondoc exists and is very cool, but doesn't quite cover what AutoDuck can do (and vise-versa, but that isn't the point now). I believe a real need exists for the functionality AutoDuck provides, and further I need it personally!

*FIG. 4*

723. Mark Hammond 06/18/99 17:15

> [Schulenburg: I have been using a freeware product called
> Autoduck to document my Python source code.]

Cool! I use AutoDuck to document all my Python extension C++ code. All the helpfiles in the Win32 extensions are generated using autoduck.

As another poster pointed out, you should look at pythondoc/gendoc. Sorry in advance for the length of this, but I am in exactly the same predicament as you, and have been thinking for a number of years how to resolve this. I'm really pleased to finally find someone else with this problem, and really hope we can solve it in a reasonable way.

However, depending on how far you have gone with AutoDuck, pythondoc/gendoc isn't solving the exact same problem. Well, they all attempt to solve the same problem, but have different strengths.

IMO, AutoDuck generates far superior reference documentation. Pythondoc's big strength is the integration with Python.

AutoDuck as 3 strengths over pythondoc that I am having trouble reconciling: pythondoc really doesn't support natural links to objects. Autoduck can say "see method" or "@xref objectmethod" to generate inline links or a cross-references section. Has been some discussion how to expand Pythondoc to support this, but a) it hasn't been done and b) it still is not as natural as autoduck.

I have come to the conclusion that we need a _new_tool – PythonDuck. It should work with Pythondoc, and be capable of enhancing its output. A new release of pythondoc uses XML, I believe, so PythonDuck could be a tool that can enhance the documentation generated by pythondoc. Alternatively we just graft it in, and beat up Daniel until he agrees :-)

This tool could possibly still work from comments, or maybe from the tad-end of the docstrings (thereby stripped from the documentation, and not messing the raw docstring too much). #@ comments could be considered "directives" for the generated output. Eg. "#@ xref SomeOtherFunction" will create a cross-references section. A comment such as #@ paramtype param_name" would direct that the param called "param_name" should be documented as being of type "SomeType" and a cross-reference to the SomeType definition be added. The tool should resolve all links at the end, and report bad links.

I know I am not making my point that well, and unfortunately don't have time to fix this. But in summary, Pythondoc exists and is very cool, but doesn't quite cover what AutoDuck can do (and vise-versa, but that isn't the point now). I believe a real need exists for the functionality AutoDuck provides, and further I need it personally! So we should try and make this happen.

Mark.

METHOD AND SYSTEM FOR DISPLAY OF ELECTRONIC MAIL

FIELD OF THE INVENTION

The present invention relates generally to the field of information display, and in particular, to the display of electronic mail collections.

BACKGROUND OF THE INVENTION

There are many circumstances in which people have to inspect the content of large e-mail folders. These folders may be personal inboxes in which large amounts of mail have accumulated, personal folders to which many messages have been routed, or archives of public or private discussion lists. For personal folders, a user may intend to sort messages into those to be discarded and those to be subjected to deeper examination or action. For mailing list archives, a user's purpose may be to understand the general concerns of the archive and to focus on those concerns, if any, that are relevant to the user. Such tasks are in contrast to focused searches for particular kinds of information.

Folder examinations are facilitated to some extent by contemporary mailers by providing high-level outline listings, with progressive disclosure that allows expansion of categories or subject items to listings of individual messages within a selected group. Further, these contemporary mailers may include a presentation that can descend to the message-list level where the first few lines of the individual messages may sometimes be included in the listings. However, such lines may be of limited utility because they often consist of a greeting followed by a quoted excerpt from a previous message. Thus, such mailers may repetitively display excerpts from the same message.

SUMMARY OF THE INVENTION

The method and apparatus of the present invention is directed to a multi-level, text-embedded display of electronic mail collections that provides a sequence of increasingly detailed presentation levels. The less detailed levels assist a user in deciding whether a thread may be of interest. The more detailed levels allow a further inspection of thread content. At all levels, threads may also be presented in such a way as to maintain ongoing awareness of the thread context of each message.

In one embodiment of the present invention the sequence begins at an overall collection level. This overall collection level lists threads, optionally together with an initial fragment of the initial message of each thread. The initial fragments are formed from the initial substantive lines, rather than the initial literal lines. Threads of the corpus may be listed in time-based, last-to-first or first-to-last orders, or in order of thread size, from longest to shortest, to obtain a good idea of which subjects are of most interest or importance to the archive contributors.

A thread of interest may then be viewed as a single document at one of at least five levels. The first level is an outline of the thread. The second level lists the messages of the threads together with the initial substantive fragments. The third level lists the messages of the thread together with the message content in a compressed text form that is described in patent application entitled METHOD AND APPARATUS FOR PRESENTING E-MAIL THREADS AS SEMI-CONNECTED TEXT BY REMOVING REDUNDANT MATERIAL, filed concurrently herewith, and the disclosure of which is totally incorporated herein by reference. A fourth level lists the messages of the thread together with the message content abbreviated, for lengthy postings, using an e-mail adapted summarization technique to abbreviate lengthy postings. A fifth level of presentation synthesizes briefer forms, for example, thread outlines with or without embedded substantive fragments and longer forms, for example, thread listings embedding compressed-text or summary forms, each form in interacting frames to facilitate navigation and to maintain thread context throughout the reading of long threads.

BRIEF DESCRIPTION OF THE DRAWINGS

Embodiments of this invention will be described in detail, with reference to the following figures:

FIG. 2 shows a display of an outline of a section of a discussion list including embedded substantive initial fragments of initial messages of threads in accordance with an embodiment of the present invention;

FIG. 5 shows a display of a compressed text form of the same lengthy message that is summarized in FIG. 4 in accordance with an embodiment of the present invention;

DETAILED DESCRIPTION OF THE INVENTION

Figure 1:
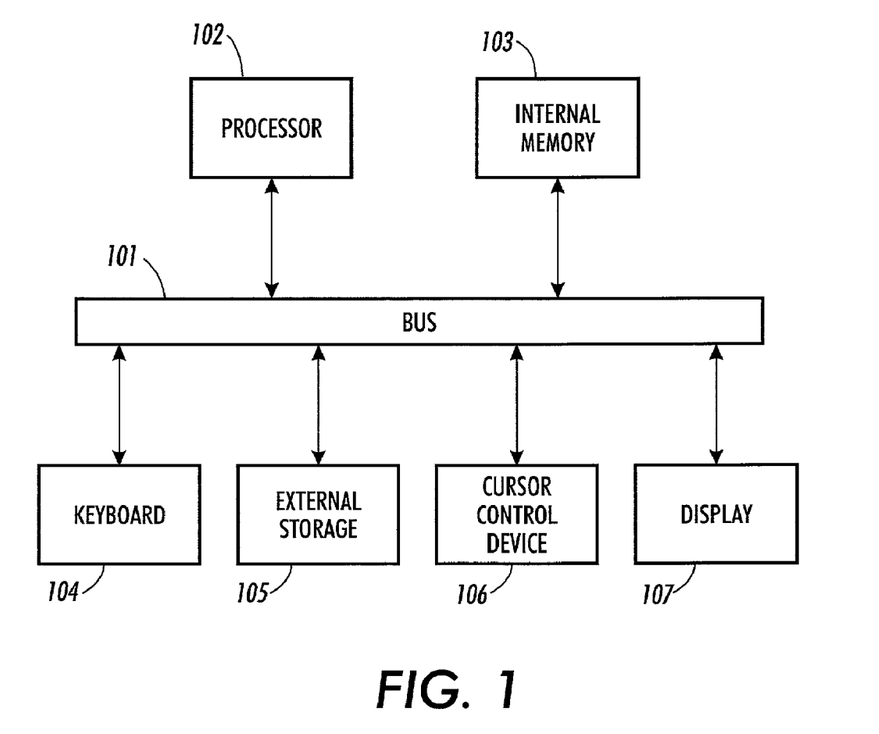
FIG. 1 is a block diagram of a computer controlled display system in accordance with an embodiment of the present invention.

The computer based system on which an embodiment of the present invention may be implemented is described with reference to FIG. 1. Referring to FIG. 1, the computer based system includes a plurality of components coupled via a bus 101. The bus 101 may include a plurality of parallel buses (e.g. address, data and status buses) as well as a hierarchy of buses (e.g. a processor bus, a local bus and an I/O bus). The computer system further includes a processor 102 for executing instructions provided via bus 101 from internal memory 103 (note that the internal memory 103 is typically a combination of random access and read only memories). The processor 102 is used to perform various operations in support of creating the tree visualizations. Instructions for performing such operations are retrieved from internal memory 103. Such operations that would be performed by the processor 102 are described with reference to FIG. 6. The processor 102 and internal memory 103 may be discrete components or a single integrated device such as an application specification integrated circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106, e.g. a mouse or trackball, typically has a button or switch associated with it to which the performance of certain functions can be programmed.

An embodiment of the present invention operates using two processes. The first process forms several types of message abbreviations. The second process involves placing the abbreviations in a collection viewing cascade. A collection viewing cascade is a collection of available views in which each have a different method of displaying a collection of threads, and of individual threads. Each view in the cascade offers a different degree of detail for the displayed item(s).

The first process, of forming message abbreviations, may be performed using the analysis aspect of the method and apparatus described in patent application entitled METHOD AND APPARATUS FOR PRESENTING E-MAIL THREADS AS SEMI-CONNECTED TEXT BY REMOVING REDUNDANT MATERIAL. The process described in that co-pending patent application provides a result with each message being decomposed into a tree or tree-equivalent such that each child node represents either a sequence of first-level material from its parent, or an excerpt of another message. The first-level children, which represent the non-quoted material of the message, are further decomposed into block types. Block types include prose paragraph blocks, blocks representing tables, sample program code and other types of line oriented material, signature material blocks and the like.

One embodiment of the present invention obtains substantive message fragments by extracting the first fixed-length initial sequence following any excerpt and/or excerpt-introduction material, with that sequence prefixed by a quote indicator if the first physical material is an excerpt. This simultaneously avoids using the fragment space to repeat text of a previous message and, at the same time, indicates the response in the original text.

Compressed text forms are developed from the analysis results using the method and apparatus described in patent application entitled METHOD AND APPARATUS FOR PRESENTING E-MAIL THREADS AS SEMI-CONNECTED TEXT BY REMOVING REDUNDANT MATERIAL, in which, the message representation consists of the non-extraneous parts of the primary text, interspersed with abbreviated, attributed top-level quotes.

Message summaries may also be developed from the analysis results. It is anticipated that summaries will be used for relatively lengthy messages. E-mail adapted summaries in accordance with the present invention differ from conventional text summaries in at least two ways. First, the e-mail adapted summaries of the present invention carefully preserve the overall structure of the messages and abbreviate only within blocks or sequence of blocks of like type and also carefully indicate where material has been deleted. Second, the e-mail adapted summarization methods are different for different types of blocks. For example, sequences of one or more prose paragraphs may be concatenated and submitted to an existing summarizer to identify the most salient sentences in a block. Then the selected sentences may be aligned with the original sentences to determine where to insert elision indicators. This procedure may be selected such that it may be automatically provided when connected paragraphs exceed a pre-determined size. For blocks representing line-oriented text, such blocks are elided by including only a pre-specified number of lines followed by elision indicators.

The embodiment of the present invention will then provide a completed message summary from the abbreviated blocks by concatenating the individual abbreviated components, together with abbreviated quoted excerpts in order of appearance in the original message. Additionally, signature and contact material may be omitted entirely.

After the individual messages are processed, the collection viewing cascade is developed. Such development may take place statically or dynamically. At the top level, threads of the collection are listed together with an initial fragment of the first message in the thread along with a prefix of the name of the author as shown in FIG. 2. Items that represent single message threads are linked directly to the associated messages. Other items are linked to individual thread displays. FIG. 2 shows a display 200 with threads 202 listed with initial fragments 204 of the first message in each thread in a first column. The display 200 also includes a second column that shows the number of messages 206 in each thread and a third column that shows the range of dates 208 over which the messages in each thread were received. The display 200 also has a link 210 for each thread, through which a user may obtain a presentation of the corresponding thread.

If a user selects a thread for viewing, the present invention provides at least five alternative views for displaying the threads in increasing levels of detail. Each level of detail uses a semi-linear thread-representation form obtained by a technique described in patent application entitled METHOD AND SYSTEM FOR PRESENTING SEMILINEAR HIERARCHY DISPLAYS, filed concurrently herewith, and the disclosure of which is totally incorporated herein by reference.

Figure 3:
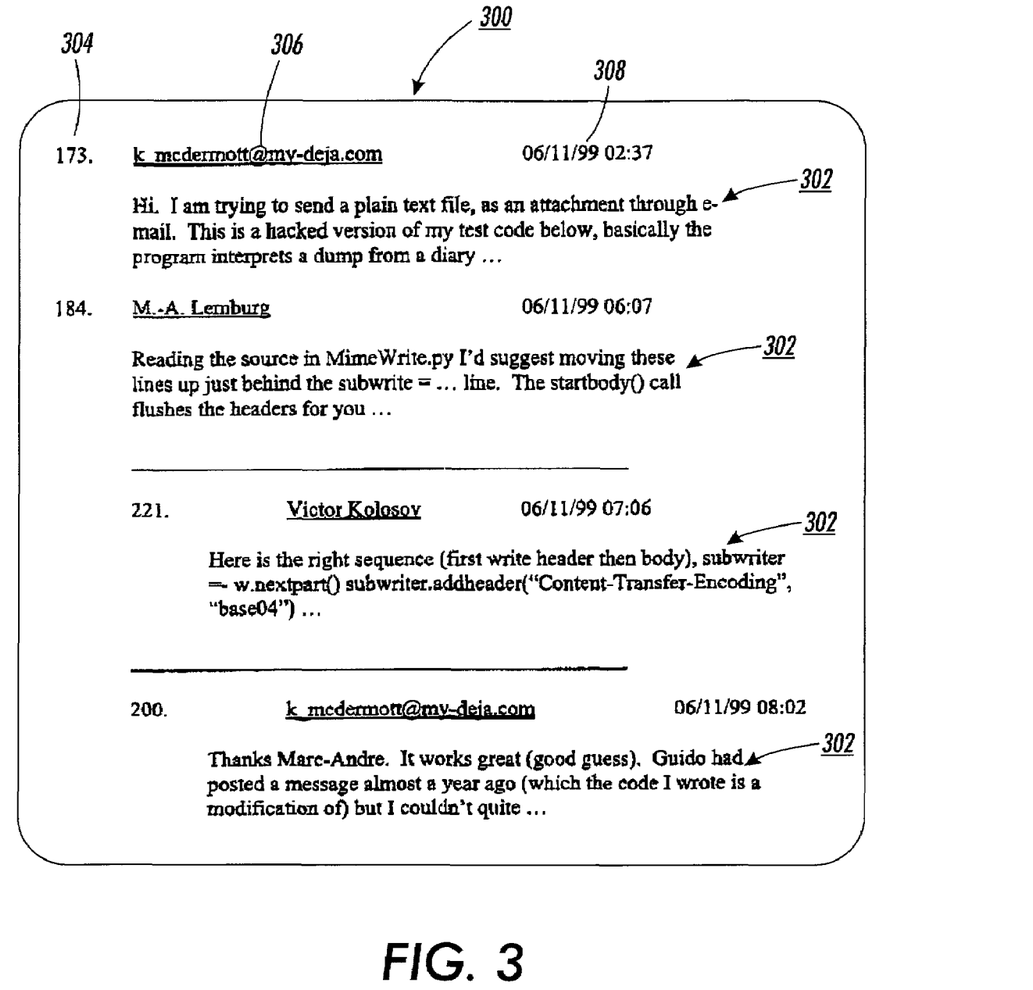
FIG. 3 shows a display of a portion of one of the threads from the discussion list shown in FIG. 2, with embedded substantive fragments for each message in accordance with an embodiment of the present invention.

The first thread viewing level provides a simple outline. This viewing level provides a general idea of the structure of long threads. A second viewing level includes a display of initial substantive fragments of each message. A display in accordance with the second viewing level is shown in FIG. 3. FIG. 3 shows a display 300 with a thread that includes initial substantive fragments 302 for each message in the thread. Each message also includes a header that includes the message number 304, a link to the underlying message 306 and the date and time of receipt of the message, 308.

The third viewing level, which provides the most detailed view, embeds into the semi-linear form a compressed text form for each message, using the technique described in patent application entitled METHOD AND APPARATUS FOR PRESENTING E-MAIL THREADS AS SEMI-CONNECTED TEXT BY REMOVING REDUNDANT MATERIAL. An example of such a compressed form is shown in FIG. 5.

Figure 4:
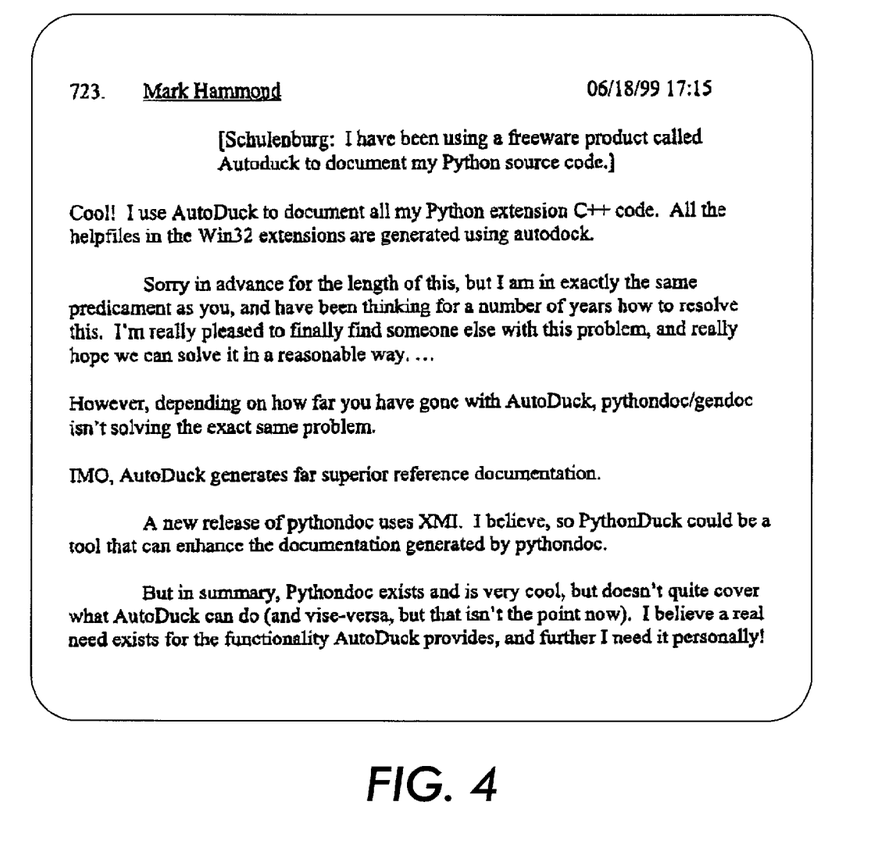
FIG. 4 shows a display of a summary form of a lengthy text message in accordance with an embodiment of the present invention.

A fourth viewing level may provide embedded e-mail-adapted summaries for each message when the compressed text form is sufficiently long to warrant an abbreviation. An example of such a summary is shown in FIG. 4. In all of the views, the message indicators are linked to the corresponding messages.

Such a viewing cascade sequence enables a user to determine which parts of the collection that they would like to inspect and to inspect only those parts at the level of detail which is appropriate to their current task.

Figure 6:
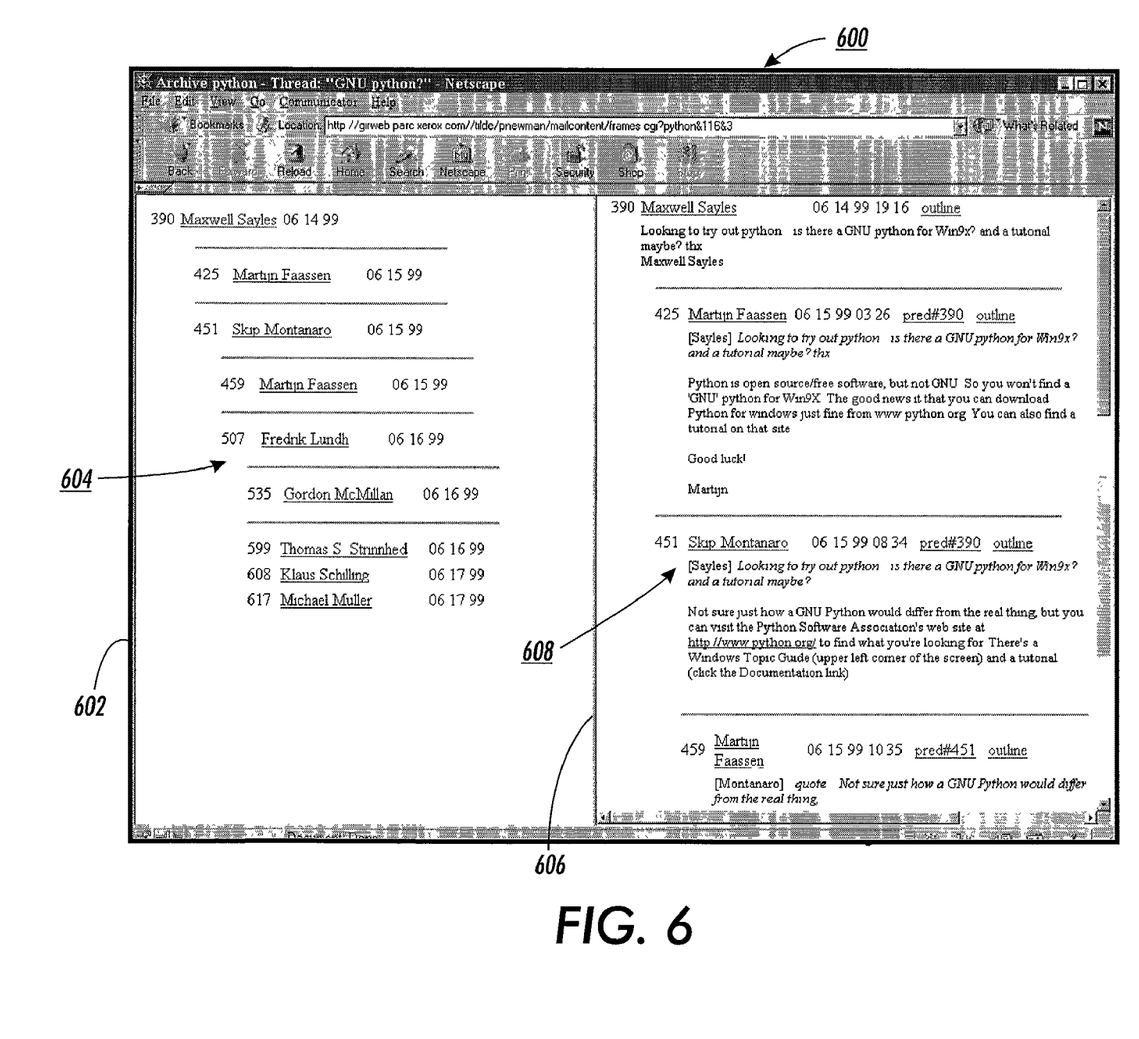
FIG. 6 shows a first display of a fifth level presentation in accordance with the present invention.
Figure 7:
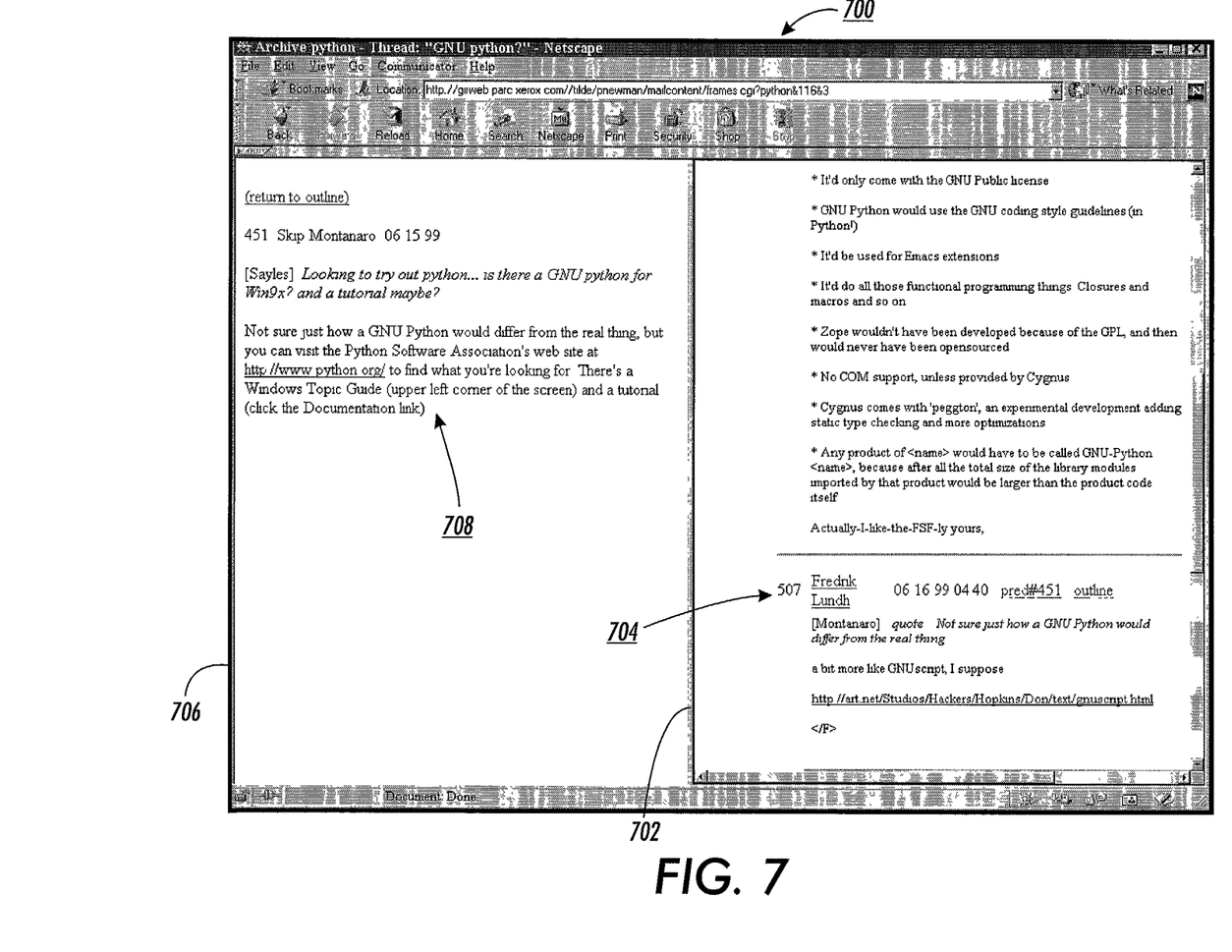
FIG. 7 shows a second display of a fifth level presentation in accordance with the present invention.

A fifth viewing level, examples of which are shown in FIGS. 6 and 7, is tailored for the detailed study of threads containing generally very long messages. Interacting frames are used to allow users to maintain an awareness of the thread context of the message being read, and to easily navigate through elements of the thread. The left-hand frame is used for context-related functions, and the right-hand frame provides the semi-linear form thread display with embedded compressed-text messages.

FIG. 6 shows a first exemplary display 600 of a thread using this fifth viewing level in accordance with an exemplary embodiment of the present invention. Here the left hand frame 602 contains the thread outline 604. It is also to be understood that the left hand frame may also contain initial fragments as shown in FIG. 3. Selecting a particular message on the left-hand frame scrolls the compressed-text form of the thread such that the selected message 608 appears within the right hand frame 606.

FIG. 7 illustrates a second display 700 of the thread of FIG. 6 using the fifth viewing level. In the right hand frame 702 a compressed-text message 704 has been scrolled into view. It allows a user to request that a view of the predecessor 708 of the message 704 be placed in the left hand frame 706. In this manner, the predecessor 708 may be kept in view as the right hand frame 702 is scrolled through its successors. The predecessor 708 may also be revisited after a long response chain associated with a successor 704. At any time, the left hand side outline form 604 shown in FIG. 6 may be restored.

Figure 8:
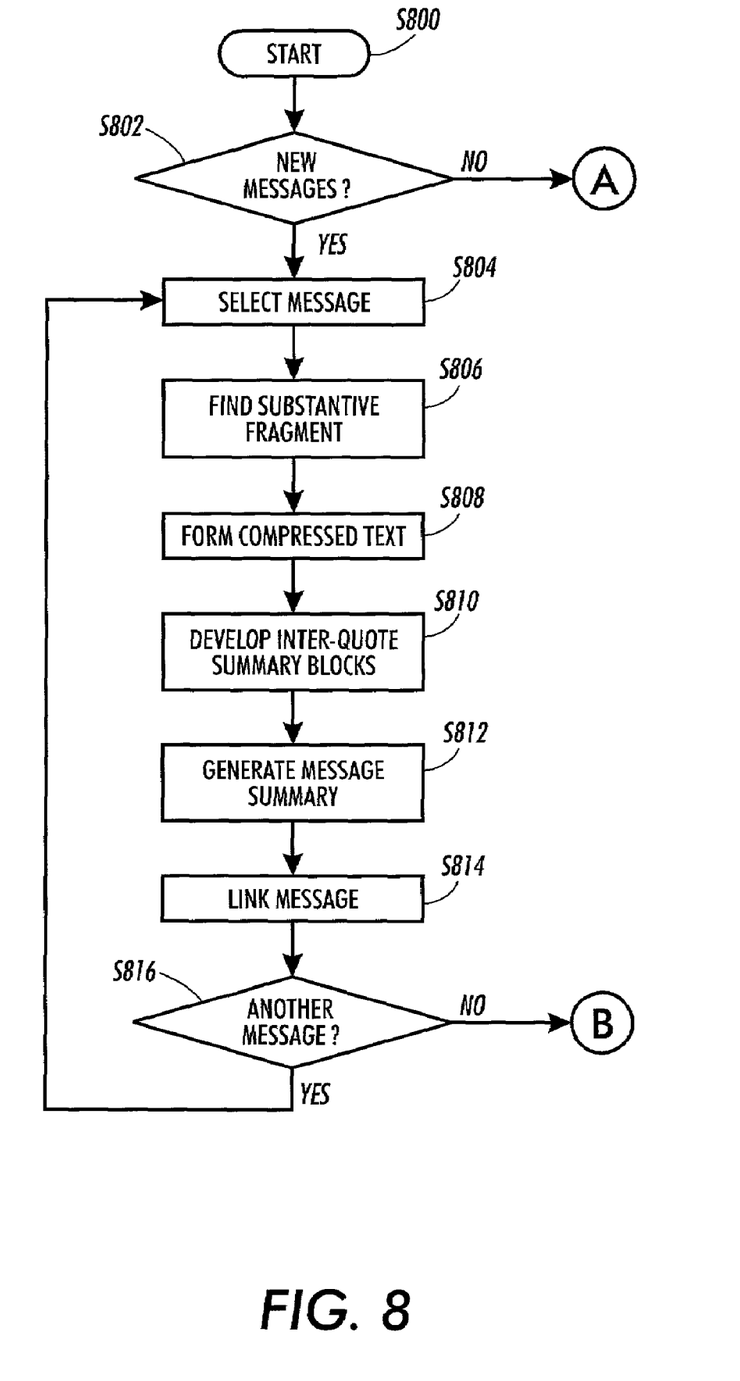
FIGS. 8 and 9 show a flowchart outlining an embodiment of a control routine in accordance with the present invention.
Figure 9:
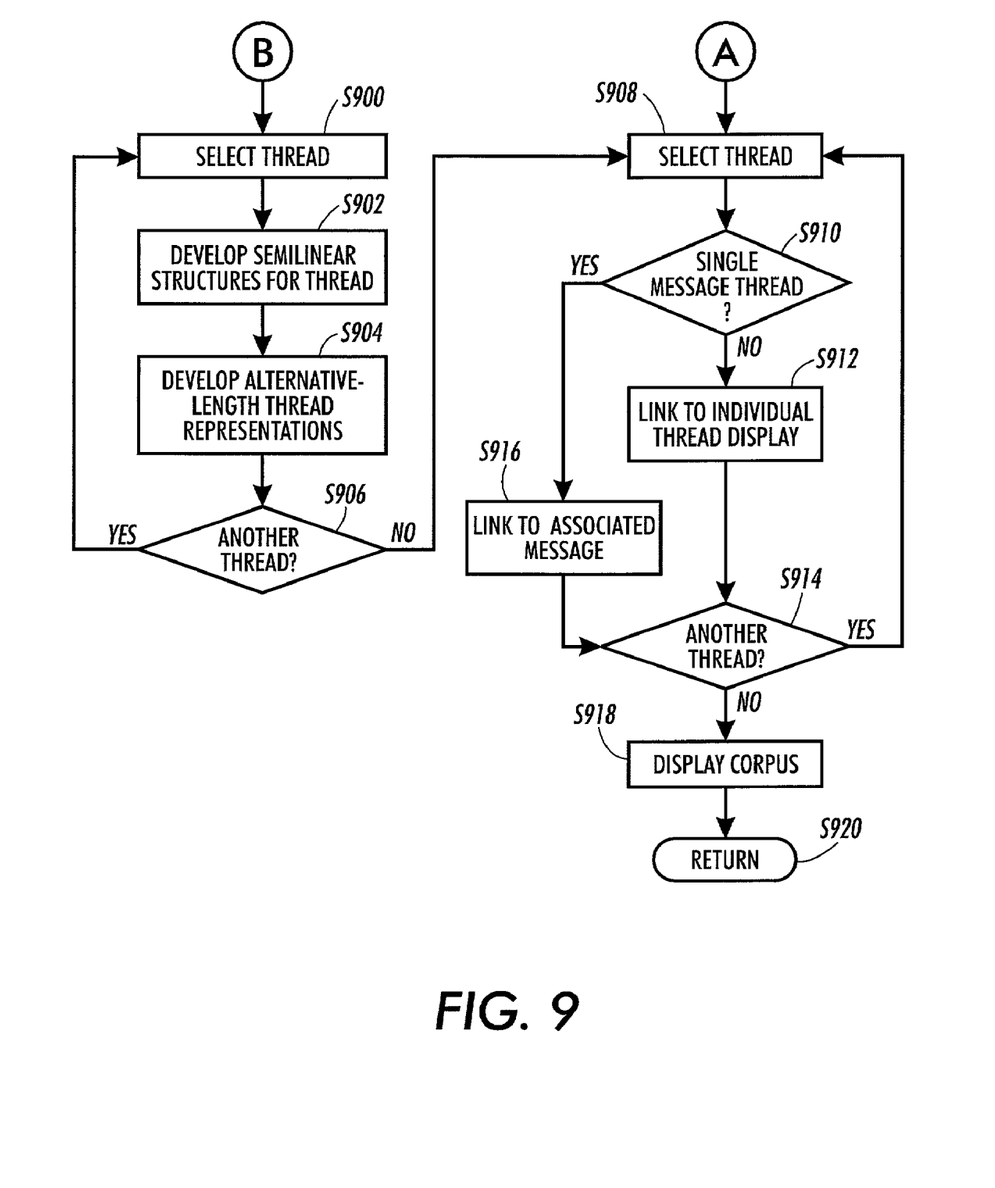

FIGS. 8 and 9 show a flowchart outlining an control routine in accordance with one embodiment of the present invention. Upon a request for a display of a corpus, the control routine starts at S800 and continues to S802. In S802, the control routine determines whether a new, non-previously processed messages have entered the corpus. If, in S802, the control routine determines that there are no new messages, then the control routine jumps to S908. If, however, in S802, the control routine determines there are new messages, then the control routine continues to S804. In S804, the control routine selects the first message in the thread and continues to S806. In S806, the control routine finds the substantive fragment for the corpus and continues to S808. In S808, the control routine forms a compressed text representation of the message and continues to S810. In S810, the control routine develops inter-quote summary blocks and continues to S812. In S812, the control routine generates a complete message summary by interspersing quotes or abbreviated quotes with inter-quote summaries and continues to S814. In S814, the control routine links the message into the appropriate thread and continues to S816. In S816, the control routine determines if there is another message in the thread. If, in S816, the control routine determines that there is another new message thread, then the control routine returns to S804. If, however, in S816, the control routine determines that no other message remains to be processed, then the control routine continues to S900.

In S900, the control routine selects the first new or modified thread and continues to S902. In S902, the control routine develops the semi-linear structure and continues to S904. In S904, the control routine develops alternative-length thread representations by inserting message fragments, compressed text, or message summaries within the semi-linear structure and continues to S906. In S906, the control routine determines if another thread in the corpus requires processing. If, in S906, the control routine determines that another thread in the corpus requires processing, then the control routine returns to S900. If, however, in S906, the control routine determines that no other thread in the corpus requires processing, then the control routine continues to S908.

In S908, the control routine prepares to display the corpus in the requested sort order by selecting the first thread in the current order and continues to S910. In S910, the control routine determines whether the current thread is a single message thread. If, in S910, the control routine determines that the current thread is a single message thread, then the control routine continues to S916. In S916, the control routine generates a link to the associated message and continues to S918. If, however, in S910, the control routine determines that the current thread is not a single message thread, then the control routine continues to S912. In S912, the control routine generates a link to the individual thread display and continues to S914. In S914, the control routine determines if another thread remains in the corpus. If, in S914, the control routine determines that another thread remains in the corpus, then the control routine returns to S908. If, however, in S914, the control routine determines that another thread does not exist in the corpus, then the control routine continues to S918. In S918, the control routine displays the corpus, presenting, for example, the thread subject for each thread, the substantive initial fragment, the selected link and the like and continues to S920. In S920, the control routine returns control of the display apparatus to the control routine that called the control routine of FIGS. 8 and 9.

As illustrated in FIG. 1, the computer controlled display system is implemented either on a single program general purpose computer, or separate program general purpose computer. However, the computer controlled display system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, or the like. In general, any device capable of implementing a finite state machine that is in turn capable of implementing the flowchart illustrated in FIGS. 8 and 9 can be used to implement the computer controlled display system according to this invention.

Furthermore, the disclosed method may be readily implemented in software using object or object-oriented software development environments that provide portable source code that can be used on a variety of computer or workstation hardware platforms. Alternatively, the disclosed computer controlled display system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The computer controlled display systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java® or CGI script, as a resource residing on a server or graphics workstation, as a routine embedded in a dedicated electronic message management system, a web browser, an electronic message enabled cellular phone, a PDA, a dedicated computer controlled display system, or the like. The computer controlled display system can also be implemented by physically incorporating the system and method into a software and/or hardware system, such as the hardware and software systems of a dedicated computer controlled display system.

It is, therefore, apparent that there has been provided, in accordance with the present invention, systems and methods for computer controlled display. While this invention has been described in conjunction with embodiments thereof, it is evident that many alternatives, modifications and variations be apparent to those skilled in the applicable arts. Accordingly, Applicants intend to embrace all such alternatives, modifications and variations that follow within the spirit and scope of this invention.

What is claimed is:

1. A method for providing a display of an electronic mail collection, comprising:
   forming at least one type of electronic mail message abbreviation from the electronic mail collection, the electronic mail collection having at least one electronic mail message, wherein each type of electronic mail abbreviation specifies a manner in which electronic mail messages in the electronic mail collection can be abbreviated;
   placing the at least one type of electronic mail message abbreviation in a collection viewing cascade, wherein the collection viewing cascade includes a plurality of viewing levels for presenting abbreviated forms of the electronic mail messages in the electronic mail collection, wherein each viewing level in the collection viewing cascade offers a different degree of detail for presenting the abbreviated forms of the electronic mail messages, and wherein the abbreviated forms of the electronic mail messages are abbreviated in accordance with the at least one type of electronic mail message abbreviation placed in the collection viewing cascade;
   receiving a selected viewing level for viewing; and
   displaying the collection viewing cascade at the selected viewing level.

2. The method of claim 1, wherein forming one type of message abbreviation comprises:
   decomposing each electronic mail message of the collection viewing cascade into a tree structure such that at least one child node represents at least one of a sequence of first-level material from its parent and an excerpt of another message; and
   decomposing sequences of first-level material into block types.

3. The method of claim 2, further comprising:
   determining which of the block types are of like type;
   abbreviating within the determined blacks of like type by including only a predetermined number of lines; and
   indicating where material has been removed from each of the determined blocks of like type by providing indicators.

4. The method of claim 2, wherein forming one type of message abbreviation comprises:
   concatenating at least one sequence of prose paragraphs including one or more sentences;
   submitting the at least one concatenated sequence to a summarizer that identifies one or more salient sentences of the one or more sentences included in the sequence of prose paragraphs; and
   determining where to insert indicators by aligning the identified salient sentences with the one or more sentences in the sequence of prose paragraphs corresponding to the identified salient sentences.

5. The method of claim 1, wherein the displaying further comprises presenting a thread structure wit substantive message fragments of each message embedded within the thread structure.

6. The method of claim 1, wherein the displaying further comprises presenting a thread structure with a compressed text representation of each message embedded within the thread structure.

7. The method of claim 1, wherein the displaying further comprises presenting a thread structure with an email-adapted summary of each message embedded within the thread structure.

8. The method of claim 1, further comprising:
   displaying a first frame that displays an outline view of a thread in the collection;
   displaying a view of the thread with embedded compressed-text message forms in a second frame;
   requesting, in the first frame, to scroll the display in the second frame to a message selected in the first frame;
   requesting to display a predecessor message of the message in the second frame; and
   displaying the predecessor in the first frame.

9. A method comprising:
   creating a message collection viewing cascade including a plurality of viewing levels for presenting at least one of one or more message threads and abbreviated forms of one or more messages which are associated with one or more message threads, wherein each viewing level in the collection viewing cascade offers a different de ee of detail for presenting the abbreviated forms of the one or more messages;
   abbreviating at least one of the messages associated with one of the message threads using one of a plurality of abbreviation techniques, wherein each abbreviation technique specifies a manner in which the messages can be abbreviated; and
   formatting each abbreviated message to be displayed at one of the plurality of viewing levels in the message collection viewing cascade.

10. The method of claim 9 further comprising presenting each abbreviated message in the collection viewing cascade at one or more of the plurality of viewing levels.

11. The method of claim 9 further comprising:
    forming a substantive message fragment for a first message in the one or more message threads using one of the abbreviation techniques; and
    formatting each message thread and corresponding substantive message fragment to be displayed in the message collection viewing cascade.

12. The method of claim 9 further comprising:
    sorting a plurality of message threads based upon a number of messages in each message thread; and
    formatting the sorted message threads to be displayed at one or more of the plurality of viewing levels.

13. The method of claim 12 wherein sorting to message threads further comprises sorting the message treads in order of largest to smallest with respect to a number of messages in each message thread.

14. The method of claim 9 further comprising associating subject line information with each message thread.

15. The method of claim 9 further comprising:
    forming a substantive message fragment for each message in one of the message threads using one of the abbreviation techniques; and
    formatting each substantive message fragment of the one message thread to be displayed in the message collection viewing cascade.

16. The method of claim 9 wherein abbreviating at least one of the messages further comprises decomposing the message into a tree structure with at least one parent node, each parent node having at least one child node, each child node representing a sequence of first-level material with respect to a corresponding parent node or representing an excerpt of another message.

17. The method of claim 16 wherein one of the plurality of abbreviation techniques comprises:
locating an excerpt of another message in each child node for each message;
replacing each located excerpt with a set of indicators; and
forming a substantive message fragment of the one message by removing all but a set number of lines from the one message, a remaining set number of lines following each set of indicators.

18. The method of claim 16 wherein one of the plurality of abbreviation techniques comprises:
shortening an excerpt of another message in each child node for each message;
decomposing sequences of first-level material in each child node into a plurality of blocks, each block representing one of a plurality of text types;
eliminating at least one of the blocks which include extraneous material; and
concatenating at least one shortened excerpt with at least one remaining block for each message while preserving an original order of the shortened excerpts and the remaining blocks within each message to form a compressed text form of the message.

19. The method of claim 16 wherein one of the plurality of abbreviation techniques comprises:
shortening an excerpt of another message in each child node for each message;
decomposing sequences of first-level material in each child node into a plurality of blocks, each block representing one of a plurality of text types;
eliminating at least one of the blocks which include extraneous material;
differentially summarizing at least one remaining block based upon the text type represented by each block; and
concatenating at least one shortened excerpt with at least one summarized block for each message while preserving an original order of the shortened excerpts and the summarized blocks within each message to form an e-mail adapted summary of the message.

20. The method of claim 9 further comprising:
receiving a selection of a viewing level with respect to viewing the message threads in the message collection viewing cascade; and
displaying at least a portion of the message threads at the selected viewing level in one of a plurality of frames in a display area.

21. The method of claim 9 further comprising:
displaying in a first frame an outline view of one of the message threads;
displaying a view of the one message thread with embedded compressed-text message forms in a second frame;
requesting, in the first frame, to scroll the display in the second frame to one of the messages in the one message thread;
requesting, in the second frame, to display a predecessor message of the one message; and
displaying the predecessor message in the first frame.

22. The method of claim 9 wherein each message comprises an electronic mail message.

23. A method comprising:
creating a plurality of message threads;
sorting the message threads based upon a number of messages in each message thread; and
formatting the sorted message threads to be displayed at one or more of a plurality of viewing levels in a collection viewing cascade, wherein each viewing level in the collection viewing cascade offers a different degree of detail for presenting abbreviated forms of the message threads, wherein the abbreviated forms of the message threads are abbreviated in accordance with at least one type of electronic mail message abbreviation that specifies a maimer in which electronic mail messages in the electronic mail collection can be abbreviated.

24. The method of claim 23 further comprising associating subject line information with at least one of the message threads.

25. The method of claim 23 wherein sorting the message threads further comprises sorting the message treads in order of largest to smallest with respect to a number of messages in each message thread.

26. The method of claim 23 further comprising presenting the sorted messages in the collection viewing cascade at the one or more selected viewing levels.

27. The method of claim 23 further comprising:
abbreviating at least one of the messages associated with one of the message threads using one of a plurality of abbreviation techniques; and
formatting the abbreviated messages to be displayed at one or more of the plurality of viewing levels in the message collection viewing cascade.

28. The method of claim 27 further comprising:
forming a substantive message fragment for a first message in at least one of the message threads using one of the abbreviation techniques; and
formatting each message dread and corresponding substantive message fragment to be displayed in the message collection viewing cascade.

29. The method of claim 23 further comprising:
receiving a selection of one of the viewing levels with respect to viewing the message threads in the message collection viewing cascade; and
displaying at least a portion of the message threads at the selected viewing level in one of a plurality of frames in a display area.

30. The method of claim 23 wherein each message comprises an electronic mail message.

* * * * *